United States Patent
Zachau et al.

(10) Patent No.: US 8,534,179 B2
(45) Date of Patent: Sep. 17, 2013

(54) REACTIVE ARMOR

(75) Inventors: Thilo Zachau, Burstadt-Riedrode (DE); Stephen Corvers, Oestrich-Winkel (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 12/460,915

(22) Filed: Nov. 23, 2009

(65) Prior Publication Data

US 2012/0006190 A1    Jan. 12, 2012

(30) Foreign Application Priority Data

Nov. 21, 2008  (DE) .......................... 10 2008 043 992

(51) Int. Cl.
*F41H 5/007* (2006.01)

(52) U.S. Cl.
USPC ............................... 89/36.17; 89/902; 89/905

(58) Field of Classification Search
USPC ......................................... 89/36.17, 902, 905
See application file for complete search history.

(56) References Cited

U.S. PATENT DOCUMENTS

| | | | |
|---|---|---|---|
| 2,902,355 A * | 9/1959 | Eckels | 149/51 |
| 4,630,411 A | 12/1986 | Salzer | |
| 4,752,970 A * | 6/1988 | Arakaki | 2/2.5 |
| 4,981,067 A * | 1/1991 | Kingery | 89/36.17 |
| 5,217,185 A | 6/1993 | Rucker | |
| 2006/0011057 A1 | 1/2006 | Yael et al. | |
| 2009/0136702 A1* | 5/2009 | Gu | 428/49 |
| 2011/0203452 A1* | 8/2011 | Kucherov et al. | 89/36.02 |

FOREIGN PATENT DOCUMENTS

| | | |
|---|---|---|
| DE | 28 31 415 | 7/1978 |
| DE | 33 13 208 | 4/1983 |
| DE | 38 40 874 | 12/1988 |
| DE | 42 23 538 | 7/1992 |
| DE | 197 07 160 | 2/1997 |
| DE | 100 48 566 | 7/2005 |
| DE | 10 2008 021 | 11/2009 |
| EP | 0 689 028 | 6/1994 |
| GB | 2 379 659 | 3/2003 |

OTHER PUBLICATIONS

Translation of excerpts from prior art, dated May 4, 2011.

* cited by examiner

*Primary Examiner* — Stephen M Johnson
(74) *Attorney, Agent, or Firm* — Ohlandt, Greeley, Ruggiero & Perle, LLP.

(57) ABSTRACT

An exemplary embodiment provides transparent reactive armor systems that are far lighter than conventional reactive armor systems due to the materials used therein. The reactive armor of embodiments of the present invention is composed of at least three layers. These layers are—from the outside to the inside—the front plate, the explosives layer and the explosives substrate as well as optional further inside layers with antiballistic effects. Consequently, the explosives substrate can be part of a multilayer laminate.

26 Claims, 5 Drawing Sheets

REACTIVE ARMOR

FIELD OF THE INVENTION

Embodiments of the present invention relate to transparent reactive armor that is, for example, suited for use as a vehicle window pane and simultaneously offers protection against kinetic energy penetrators and hollow large projectiles. Further, embodiments of the invention relate to a method for production of a transparent reactive armor.

RELATED ART

Reactive armor is usually used on the exposed surfaces of armored vehicles. The reactive armor functions in such a way that the impact or the jet of a detonating hollow charge projectile induces detonation of an explosive component present in the reactive armor, thereby effecting parts of the reactive armor to start relative movement against the hollow charge projectile. Thus, the jet is deflected, disturbed or destroyed so that its penetration efficiency is weakened. Additionally, the reactive armor is supposed to protect from kinetic energy penetrators. In such a scenario the penetrator, impacting on the reactive armor with a velocity of $V_p$, induces explosion of the explosive component residing between the plates of the reactive armor. By explosion of the explosive component, the plates divide from each other with a plate velocity $V_{pl}$. Thus, the shear forces affecting the intruding penetrator break or harm the penetrator to such an extent that its destructive effect is strongly decreased. This principle of reactive armor is for example described in DE 19 707 160.

It is known for example from DE 3 840 874 that reactive armor can comprise glass components. Passive transparent glass-ceramic armor is known from GB 2 379 659A. The prior art, however, does not teach transparent reactive armor systems.

SUMMARY

An exemplary embodiment of the present invention provides transparent reactive armor systems that are far lighter than conventional reactive armor systems due to the materials used therein. The reactive armor of embodiments of the present invention is composed of at least three layers. These layers are—from the outside to the inside—the front plate, the explosives layer and the explosives substrate as well as optional further inside layers with antiballistic effects. Consequently, the explosives substrate can be part of a multilayer laminate.

DETAILED DESCRIPTION OF EMBODIMENTS OF THE PRESENT INVENTION

Figure 1:
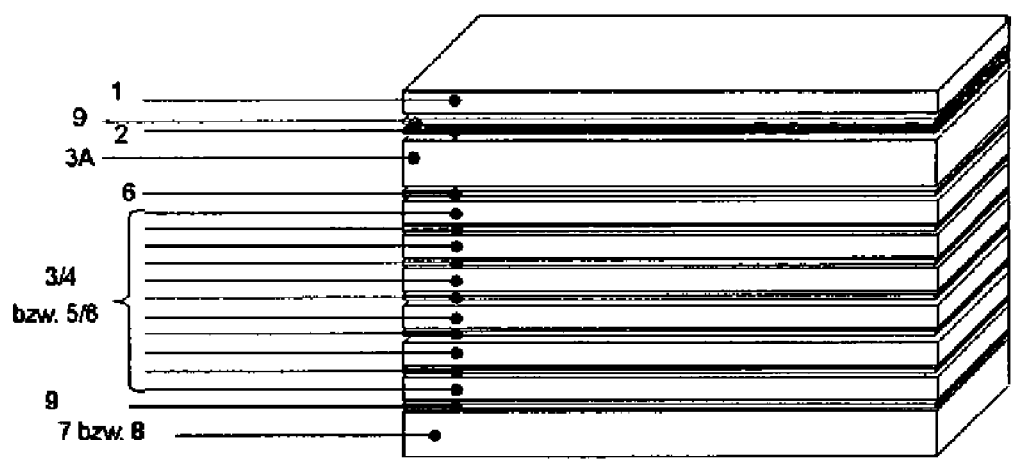
FIG. 1 shows an exemplary assembly of a reactive armor.

Example embodiments of the invention are discussed below. While specific example embodiments are discussed, it should be understood that this is done for illustration purposes only.

As a reactive armor is only effective if it deflects or destroys the impacting projectile or hollow charge, the exterior plate facing the projectile should include very hard material. Namely this front plate is accelerated in direction of the incoming projectile by the explosive component present in the reactive armor. According to an exemplary embodiment of the present invention the front plate comprises glass, glass-ceramic or transparent ceramic material. Preferably the front plate comprises transparent ceramic that is selected from the group consisting of or comprising at least one of sapphire, spinel, aluminum garnet, spinel ceramics, aluminum oxide ceramic, yttrium oxide ceramic, aluminum garnet ceramic and aluminum oxynitride ceramic. Preferably the ceramic components are selected from the group consisting of or comprising at least one of aluminum oxide ceramic, aluminum oxynitride ceramic, spinel and aluminum garnet. Most preferred are aluminum oxide ceramic and/or aluminum oxynitride ceramic.

Further parts of the reactive armor that are oriented towards the protected object comprise the explosives substrate as well as further optional inside layers that are antiballistically effective. These layers have to be sufficiently stable so that they can resist the explosive effect of the explosives layer. Detonation of the explosive component releases a shockwave that spreads in the substrate with sonic velocity and causes local compression. The substrate should to be stable against these local compressions. According to an exemplary embodiment of the present invention the explosives substrate comprises a glass ceramic. In case the explosives substrate is part of a multilayer laminate the further antiballistically effective layers comprise glass or glass-ceramic and plastic layers. The explosives substrate itself may include glass-ceramics. Because of the nano scale heterogeneity of the glass-ceramics ("soft" glass phase next to "hard" crystallites) this class of materials is predestinated by its nanoscale compressibility to resist compressions from shock waves to a certain extent. These properties qualify glass-ceramic especially over glass or plastics in some circumstances. Plastics on the other hand have the advantage of a lower sound velocity of shock wave transmission. Preferably, those parts of the reactive armor that follow the explosives substrate in direction of the protected object comprise a multilayer laminate of glass or glass-ceramic and plastics.

According to an exemplary embodiment of the present invention the explosive component used and the explosive layer are transparent as well. The explosive component should have sufficient explosive force within the reactive armor in order to transmit the necessary kinetic energy, which is needed to deflect the projectile, to the front plate. The explosive component can be applied in the form of plates. It is especially preferred to disperse transparent explosive crystals in a transparent matrix. The explosive crystals preferably have particle sizes of smaller than 1 mm$^3$. The matrix, within which the explosive crystals are dispersed, is preferably comprised of plastics. The explosive component should preferably meet the following criteria:

- availability in form of transparent, preferably colorless, particles,
- ignition temperature<manufacturing temperature of the dispersion in the plastic matrix,
- ignition temperature<operation temperature of the armor and
- actuation of the detonation by shock wave of projectile impact or thermally.

It is preferred to use an explosive component that is selected from
perhydro-1,3,5-trinitro-1,3,5-triazine (RDX)

octahydro-1,3,5,7-tetranitro-1,3,5,7-tatrazocin (HMX)
pentaerythritoltetranitrate (PETN)
2,2',4,4',6,6'-hexanitrophenylethylen (HNS)

According to an exemplary embodiment of the present invention the reactive armor is transparent. Transparent in this sense means that the reactive armor has a high overall transmittance for visible and infrared light in a wavelength region between 380 and 1000 nm so that the brightness value Y for standard illuminant A radiating through the material under 2°-observation is $Y_{A/2°}>50$. The brightness value Y of the CIE-xyY color measuring system is indicated for standard illuminant A radiating through the specimen under 2°-observation and can be determined from wavelength-resolved transmission spectra with the aid of the CIE-defined eye sensitivity $x(\lambda)$, $y(\lambda)$, $z(\lambda)$ (tristimulus curves; Commission internationale de l'Eclairage proceedings, 1931. Cambridge University Press, Cambridge or DIN 5031):

$$X = \int_0^\infty 1(\lambda)\bar{x}(\lambda)d(\lambda)$$
$$Y = \int_0^\infty 1(\lambda)\bar{y}(\lambda)d(\lambda)$$
$$Z = \int_0^\infty 1(\lambda)\bar{z}(\lambda)d(\lambda)$$

$\lambda$: wavelength of the monochromatic light;
$1(\lambda)$: intensity of the monochromatic light $1(\lambda)=\tau(A)*f_{A/2°}(\lambda)$: wavelength—resolved transmission of the specimen $\tau(\lambda)$ multiplied with the wavelength-resolved intensity factor for standard illuminant under 2°-observation $f_{A/2°}$ The color coordinates x and y can be calculated as follows:

$$x = \frac{X}{X+Y+Z}$$
$$y = \frac{Y}{X+Y+Z}$$

The white point for standard illuminant A is defined by:
$x_{u,A}=0.4476$
$y_{u,A}=0.4074$ For the best overall transparency of the system, the outside plate facing the projectile as well as the explosives layer and the explosives substrate layer as well as optional further antiballistically effective layers should be transparent; i.e. the layers should themselves have high transparencies for visible light so that the brightness value of the whole system of the transparent reactive armor for standard illuminant A radiating through it under 2°-observation is $Y_{A/2°}>50$. Reflection losses of below 0.5% are preferred at any boundary layer A/B within the transparent reactive armor system. Therefore the components of the transparent reactive armor in direct vicinity to each other are selected such that they do not differ significantly from one another in terms of refractive indexes. The difference in refractive indexes is $|\Delta n|<0.25$, preferably $<0.1$, more preferred $<0.05$ and most preferred $<0.01$. If the difference in refractive indexes between these layers is too high, reflection losses on the boundary layers lead to decreased transmission of the system (lower transparency).

In a preferred embodiment of the present invention the explosives layer is segmented so that the explosive present in the transparent reactive armor is not consumed all at once. This is achieved by the explosives substrate comprising recesses filled with the explosive component. Form and size of these recesses determine the available amount of explosives and thereby also determine the kinetic energy that can be transmitted to the front plate. Self-evidently, form and size of these recesses are dependant from the explosive component used in the transparent reactive armor.

The front plate can also be structured or segmented so that it is not completely consumed by one single hit but provide further satisfactory protection next to the first hit.

In order to achieve high uniformity of the segments in a closed front plate a regular polyhedral structure is preferred (for example equilateral triangles, rectangles, pentagons, hexagons etc.). The structure of the front plate tiling depends on the structuring of the explosives layer. It can be congruent or it may be such that some explosive segments overlap.

In a special embodiment of the present invention the plastic portions of the transparent reactive armor system as well as the explosive component itself can be strengthened with fibers. In order to maintain transparency of the whole system the same considerations regarding differences in refractive indexes of the other layers also apply to the differences between fibers and plastics as well as fibers and explosives. The fibers preferably have a diameter of smaller than 10 µm and a length of more than 5 mm. Preferred fiber materials are glass fibers, glass-ceramic fibers and plastic fibers like for example Aramid®. The incorporation of the fibers into the plastic or explosive component can be made in form of a fabric or randomly oriented fibers. Especially preferred are glass or glass-ceramic fibers with refractive index differences in relation to the plastics or explosives component $|\Delta n|<0.016$. PVB- or TPU-material are preferably strengthened with Dura®-fibers ($n_d=1.473$). PVB is for example TROSIFOL® XT90 with $n_d=1.482$ and TPU is for example ETIMEX® Vistasolar® with $n_d=1.4887$.

Fiber-strengthened polycarbonates that can constitute the plate that is the nearest to the protected object, so called spall shield, in the transparent reactive armor are for example described in U.S. Pat. No. 5,807,914 and U.S. Pat. No. 7,208,542.

According to an exemplary embodiment of the present invention it is provided a transparent reactive armor comprising at least one front plate, at least one explosives layer and an explosives substrate layer. The explosives substrate layer comprises a glass-ceramic material. Preferably the front plate comprises a ceramic. Preferably, the transparent reactive armor is a multilayer laminate that comprises a front plate, at least one explosives layer, an explosives substrate layer as well as further optional antiballistically effective layers made of glass, glass-ceramic or plastics that are connected with each other by plastic layers. These connecting plastic layers can preferably be made of transparent thermoplastic polyurethane or polyvinylbutyral. The antiballistically effective layers can be layers of transparent plastics which are preferably selected from the group consisting of or comprising at least one of:
thermoplastic polyurethanes
polyvinyl butyrals
ethylene/vinyl acetate copolymers
polycarbonates
polymethylene methacrylates
polyurethanes
polycaprolactames
polyisoprenes
polyethylenes
polyethylene terephthalates
polyether imides
polyether etherketones
cross-linked or partly cross-linked polyester resins cross-linked or partly cross-linked vinylester resins
cross-linked or partly cross-linked epoxide resins The above is a list of preferably used plastics. It is preferred that one or more of the following plastics are used: thermoplastic polyurethanes, polyvinyl butyrals, ethylene/vinylacetate copolymers, polycarbonates and polymethylene methacrylates. It is especially preferred that thermoplastic polyurethanes or polyvinyl butyrals are used as connecting plastic layers in the multilayer laminate (see for example FIG. 1, reference numerals 6 or 5). Further, it is especially preferred that ethylene/vinylacetate copolymers are used as casting resin for connection of the front plate and the explosives layer as well as for connection of the further plastics layers, following in direction of the protected object, with the further layers of the laminate (spall shield, for example FIG. 1, reference numeral 9). It is further preferred that one or more of the plastics mentioned in the following list is used as matrix material for the explosive component: polyurethanes, polycaprolactames, polyisoprenes, polyethylenes, polyethylene terephthalates, polyether imides, polyether etherketones, cross linked or partly cross-linked polyester resins, cross-linked or partly cross-linked vinyl ester resins, cross-linked or partly cross-linked epoxide resins.

The plastics or explosive portions in the transparent reactive armor can be strengthened with glass fibers or glass-ceramic fibers.

Preferred transparent glass-ceramics as the glass-ceramic portion in the transparent reactive armor system are selected from the group consisting of or comprising at least one of:

Glass-ceramics with high quartz mixed crystal ($Li_{2-x}(Mg, Zn)_{x/2}Al_2[SiO_4]_2$ ($x=0 \ldots 1$)) as the main crystal phase and in a composition in % by weight at least comprising:

| | |
|---|---|
| $Li_2O$ | 3.0-4.5 |
| $Al_2O_3$ | 18.0-24.0 |
| $SiO_2$ | 55.0-70.0 | as well as 0.6 to 6.0% by weight nucleation agent oxides selected from the group consisting of or comprising at least one of $TiO_2$, $ZrO_2$, $SnO_2$, $HfO2$.

Glass-ceramics with keatit mixed crystal ($Li_2O*Al_2O_3*4.8\ SiO_2$) as the main crystal phase and in a composition in % by weight at least comprising:

| | |
|---|---|
| $Li_2O$ | 3.0-4.5 |
| $Al_2O_3$ | 15.0-25.0 |
| $SiO_2$ | 60.0-70.0 | as well as 0.5 to 6.0% by weight nucleation agent oxides selected from the group consisting of or comprising at least one of $TiO_2$, $ZrO_2$, $SnO_2$, $HfO_2$.

Glass-ceramics with lithium disilicate or lithium metasilicate as the main crystal phase and in a composition in % by weight at least comprising:

| | |
|---|---|
| $Li_2O$ | 5.0-15.5 |
| $Al_2O_3$ | 2.0-8.0 |
| $SiO_2$ | 60.0-80.0 | as well as 0.6 to 10.0% by weight nucleation agent oxides selected from the group consisting of or comprising at least one of $TiO_2$, $ZrO_2$, $SnO_2$, $HfO_2$.

Glass-ceramics with nepheline ($Na_{8-x}K_xAl_8Si_8O_{32}$, $x=0.25 \ldots 4.73$) as the main crystal phase and in a composition in % by weight at least comprising:

| | |
|---|---|
| $Na_2O$ | 0.1-22.0 |
| $K_2O$ | 0.1-26.0 |
| $Al_2O_3$ | 30.0-45.0 |
| $SiO_2$ | 35.0-50.0 | as well as 6.0 to 10.0% by weight nucleation agent oxides selected from the group consisting of or comprising at least one of $TiO_2$, $ZrO_2$, $SnO_2$, $HfO_2$.

Glass-ceramics with spinel mixed crystal ($Mg_xZn_{1-x}Al O_4$ ($x=0 \ldots 1$)) as the main crystal phase and in a composition in % by weight at least comprising:

| | |
|---|---|
| MgO + ZnO | 5.0-20.0 |
| $Al_2O_3$ | 15.0-25.0 |
| $SiO_2$ | 50.0-65.0 | as well as 5 to 15.0% by weight nucleation agent oxides selected from the group consisting of or comprising at least one of $TiO_2$, $ZrO_2$, $SnO_2$, $HfO_2$.

Glass-ceramics with forsterite ($MgSiO_4$) as the main crystal phase and in a composition in % by weight at least comprising:

| | |
|---|---|
| MgO | 13.0-30.0 |
| $Al_2O_3$ | 10.0-25.0 |
| $SiO_2$ | 30.0-60.0 |
| $K_2O$ | 8.0-20.0 | as well as 0.5 to 10.0% by weight nucleation agent oxides selected from the group consisting of or comprising at least one of $TiO_2$, $ZrO_2$, $SnO_2$, $HfO_2$.

The glass-ceramic used is preferably selected from the group consisting of or comprising at least one of high quartz mixed crystal, spinel mixed crystal, lithium disilicate and lithium metasilicate. The most preferred are high quartz mixed crystal and/or spinel mixed crystal.

Preferred glasses as the glass component of the transparent reactive armor system are preferably selected from the group consisting of or comprising at least one of:
  soda-lime glass
  aluminosilicate glass borosilicate glass flint glass
  heavy flint glass
  crown glass.

The glasses used as the glass material in the transparent reactive armor system can be thermally pre-stressed or chemically hardened. It is preferred that a glass is used that is selected from the group consisting of or comprising at least one of flint glass, heavy flint glass and crown glass.

The ceramic portion of the transparent reactive armor system preferably has a thickness of 3 to 8 mm. Especially preferred are thicknesses from 4 to 6 mm. Within the multilayer laminate the glass-ceramic layers are preferably between 5 and 20 mm thick and the plastic layers connecting the glass, glass-ceramic, explosives, explosives substrate or plastics portions of the transparent reactive armor system are preferably between 0.25 and 1 mm thick.

In order to provide the necessary overall light transmittance of the transparent reactive armor system of $Y_{A/2°} > 50$ it is preferred that the absolute value of the difference of the refractive indexes |Δn| of two materials meeting at a boundary layer within the transparent reactive armor system is ≦0.25 and further preferred ≦0.01. In order to provide for sufficient transparency especially for the explosives layer the absolute value of the difference of the refractive indexes |Δn| of the explosive component and the explosive matrix is preferably smaller or equal to 0.001.

Embodiments of the present invention further refers to a method of production of a transparent reactive armor, wherein the method comprises the following steps: layering the different layers of the multilayer laminate above one another, manufacturing of the multilayer laminate in an autoclave, applying the explosive, laminating the front plate onto the explosive layer.

The laminate is preferably produced according to the Lamination Guidelines of the plastic manufacturers.

Figure 4:
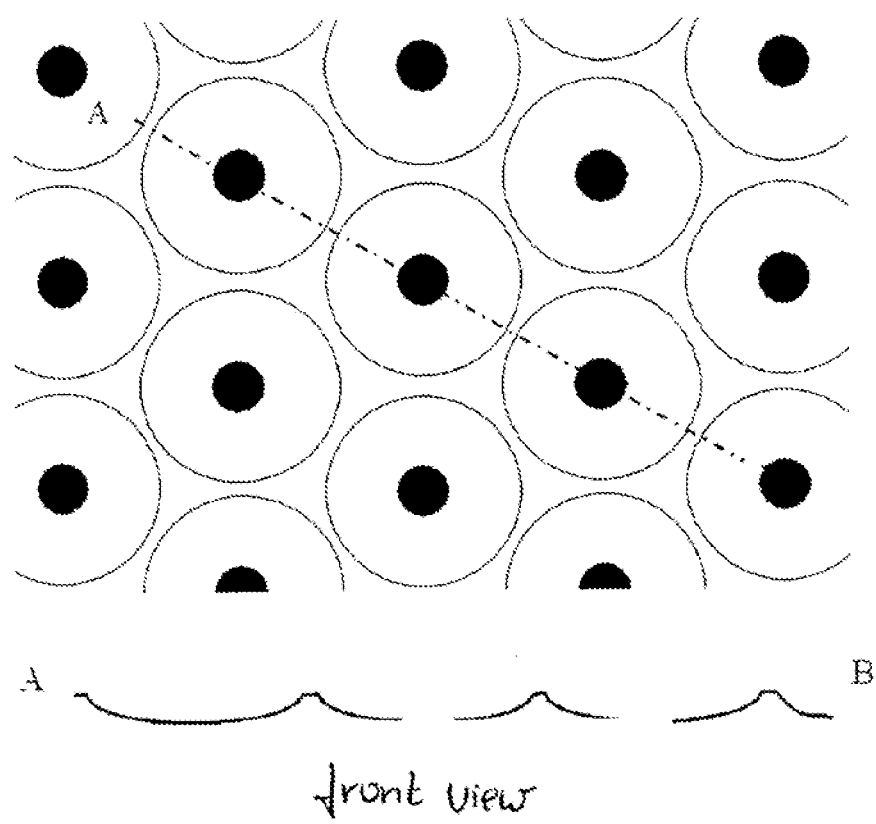
FIG. 4 shows an alternative structural pattern according to an embodiment of the invention.

In an example, a glass-ceramic panel (ROBAX®, Schott AG) of the size 500*500 mm² with a thickness of 15 mm that has been furnished with a pattern of recesses according to FIG. 4 (polished calotte recesses; diameter=30 mm, maximum depth=3 mm, volumes of the recesses=1.075 cm³, distance of adjacent deepest points=31 mm) serves as the explosives substrate. On the nonstructured surface of the panel a TPU foil of 0.38 mm thickness is placed centrically (505*505 mm², DUREFLEX® A 4700, Deerfield Urethane, $n_d$=1.545). Further glass-ceramic panels (ROBAX®, Schott AG) of the sizes 500*500 mm² with thicknesses of 8 mm and interlayers of TPU foil with thicknesses of 0.38 mm follow (505*505 mm² DUREFLEX® A 4700, Deerfield Urethane); the closing layer is a polycarbonate panel (Macrolon®, Bayer AG) with a thickness of 15 mm and a size of 500*500 mm² so that the following layer sequence is obtained:
1. explosives substrate
2. TPU
3. Robax 8 mm
4. TPU
5. Robax
6. TPU
7. Robax 8 mm
8. TPU
9. Robax
10. TPU
11. Robax 8 mm
12. TPU
13. polycarbonate The multilayer laminate is made in an autoclave according to the DUREFLEX lamination guidelines.

A mixture of purified 80% (v/v) octahydro-1,3,5,7-tetranitro-1,3,5,7-tetrazocine (HMX) in sphere shapes (0.75 . . . 0.8 mm diameter, volume=about 0.244 mm³, $n_d$=1.594) and 20% (v/v) polydiphenyl methyl methacrylate ($n_d$=1.5933) is cast in the calotte shaped recesses of the explosives substrate (ROBAX, $n_d$=1.544) and covered with a TPU foil (0.38*505*505 mm³, DUREFLEX® A 4700, Deerfield Urethane, $n_d$=1.545). The front plate is made from a polished EFG-sapphire plate (Saphikon®, Saint Gobain Crystals, $n_d$=1.78) with a thickness of 5 mm and a size of 60*120 mm² according to the pattern in FIG. 5D. A lamination step is done in an autoclave according to the DUREFLEX lamination guidelines.

The brightness value Y for standard illuminant A light radiating through the transparent reactive armor under 2°-observation is $Y_{A/2°}$=51.2.

A bombardment test was done with an antitank grenade PG-7 from a 40 mm bazooka RPG-7 shot from a distance of 250 m with an impact velocity of 300 m/s and an angle of impact of 45°. A witness plate made from 100 mm strong RHA steel was placed 50 cm vertically behind the transparent reactive armor and was damaged on the surface in an area of 5*15 cm by the hollow charge jet but not penetrated.

In a comparable bombardment test with a laminate which was equally constructed but free of explosive components the witness plate is damaged on an area of 10*15 cm and partially penetrated.

Without armor in front of it the witness plate is totally penetrated or destroyed in a circular area of 10 cm diameter.

The hollow charge resistance of the transparent reactive armor in comparison to a passive armor is thereby shown.

FIG. 1 shows an exemplary assembly of a reactive armor with a front plate 1 that is connected to an explosives layer 2 by a casting resin 9. The explosives layer 2 is connected to a glass-ceramic plate 3A with contact to the explosives. In direction of the protected object there is a plastic layer of transparent polyurethane (TPU) as well as alternating glass ceramic plates 3 and plastic layers of polyvinyl butyral 5 or alternating layers of glass plates 4 and plastic layers of transparent polyurethane 6. In direction of the protected object there is a further casting resin layer 9. The next layer is a layer of polycarbonate 7 or polymethylene methacrylate 8. The casting resin layers can be replaced by a plastic layer of polyvinylbutyral 5 or transparent polyurethane 6.

Figure 2:
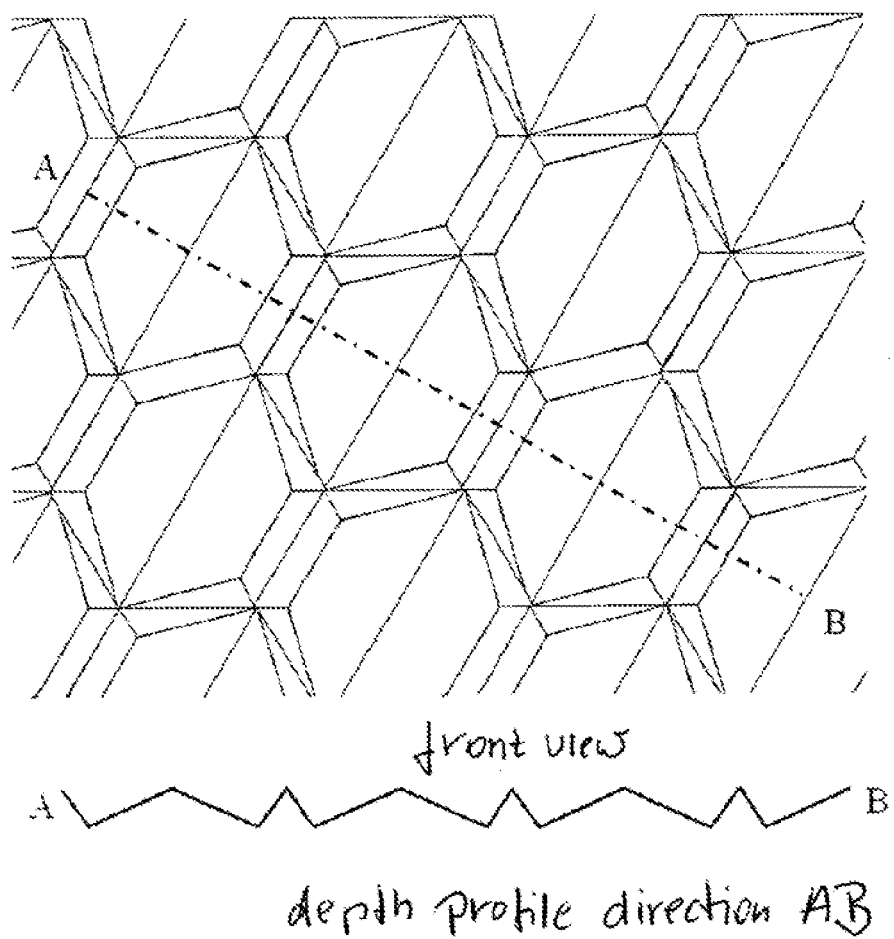
FIG. 2 illustrates a structuring pattern according to an embodiment of the invention.

FIG. 2 illustrates a structuring pattern on the glass-ceramic plate 3A on the surface facing the explosive layer. The recesses can receive the explosive component. Thereby it is achieved that single explosive portions are separated from each other, which prevents ignition of the whole explosive layer as a consequence of local hits. Optionally, it is possible to extend the explosive layer over the maximum depth of the recesses so that a single layer with local explosive clusters (in the area of the recesses) results so that higher explosive power can be achieved there. This is especially interesting if a single front plate covers a large number of recesses and shall be accelerated equally.

Figure 3:
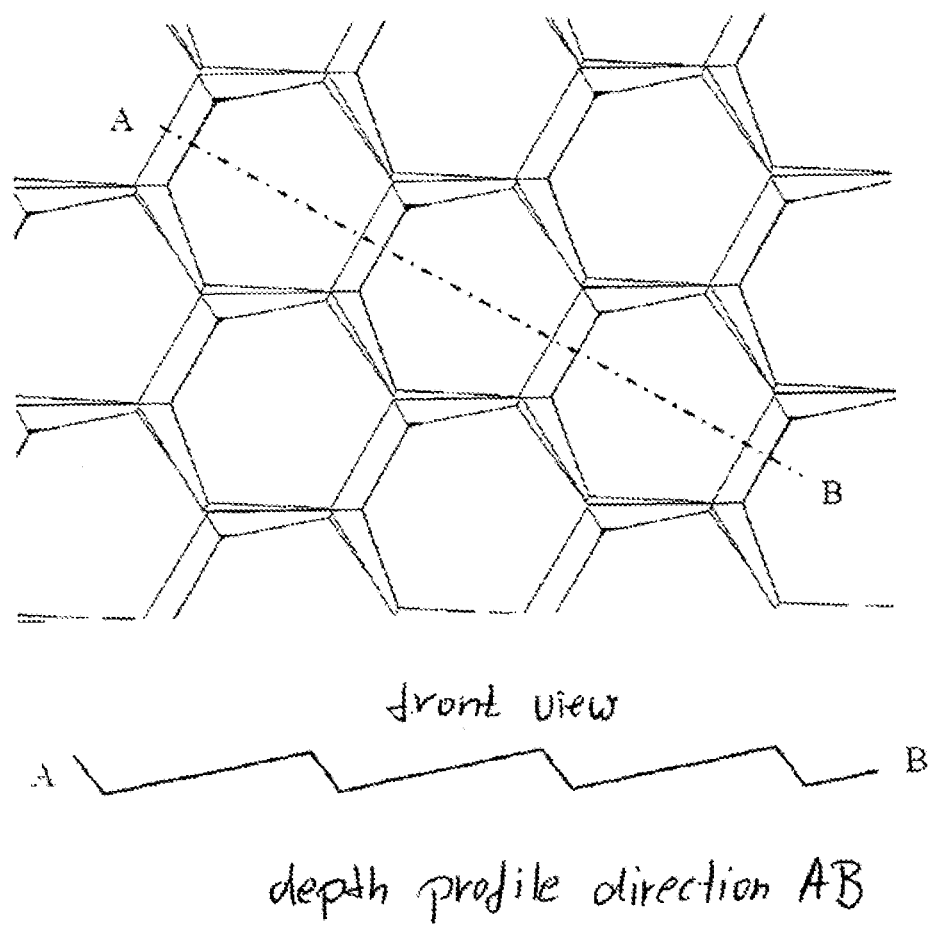
FIG. 3 shows an alternative structural pattern according to an embodiment of the invention.

FIG. 3 shows an alternative structural pattern of a glass-ceramic plate 3A on the surface facing the explosive layer.

FIG. 4 shows an alternative structural pattern of a glass-ceramic plate 3A on the surface facing the explosive layer.

Figure 5:
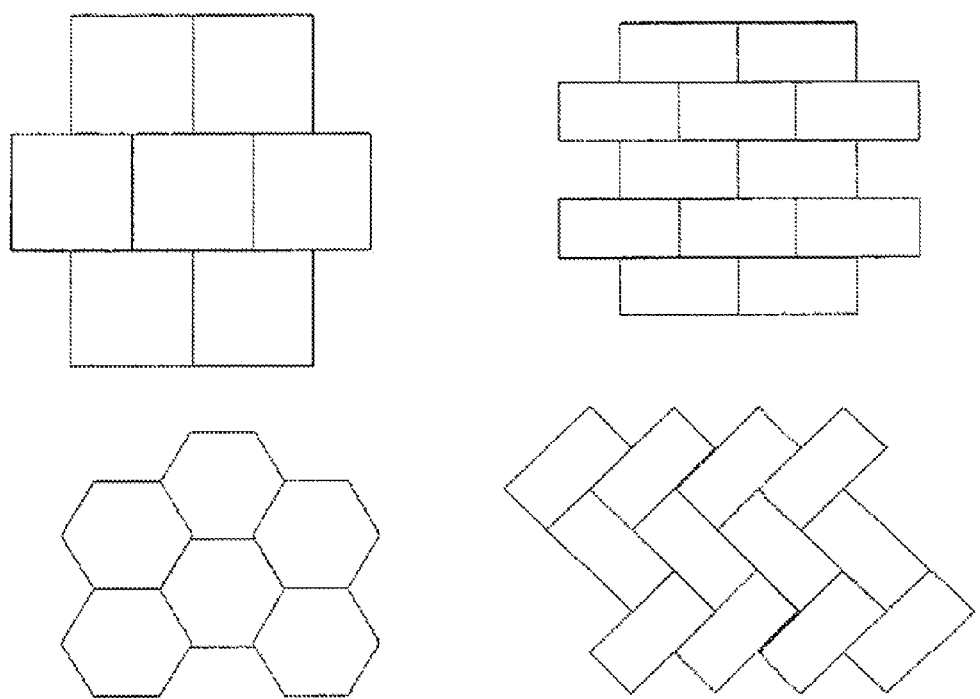
FIG. 5 shows patchwork structures in embodiments of the reactive armor.

FIG. 5 shows preferred patchwork structures in embodiments of the reactive armor, wherein more than one front plate is used.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:
1. A layered transparent reactive armor comprising:
    at least one front plate having a strike face;
    at least one explosives layer on a side of the at least one front plate that is opposite to said strike face, wherein the at least one explosives layer comprises an explosive component dispersed in a matrix; and
    an explosives substrate layer on an opposite side of the at least one explosives layer from the at least one front plate, wherein the explosives substrate layer comprises glass-ceramic.
2. The transparent reactive armor according to claim 1, further comprising a plastic layer.
3. The transparent reactive armor according to claim 1 or claim 2, wherein the at least one front plate is segmented.

4. The transparent reactive armor according to claim 1, wherein the at least one front plate comprises a material that is selected from the group consisting of
 a. glass;
 b. glass-ceramic; and
 c. ceramic.

5. The transparent reactive armor according to claim 1, wherein the explosives substrate layer is part of a multilayer laminate.

6. The transparent reactive armor according to claim 1, wherein the explosives substrate layer is part of a multilayer laminate and the multilayer laminate comprises at least two further layers in addition to the explosives substrate layer.

7. The transparent reactive armor according to claim 6, wherein the further layers comprise a material selected from the group consisting of glass, glass ceramic, ceramic, plastic, and a combination thereof.

8. The transparent reactive armor according to claim 4 or 7, wherein the glass is selected from the group consisting of
 a. soda-lime glass;
 b. alumino silicate glass;
 c. borosilicate glass;
 d. flint glass;
 e. heavy flint glass; and
 f. crown glass.

9. The transparent reactive armor according to claim 8, wherein the glass is chemically hardened.

10. The transparent reactive armor according to claim 8, wherein the glass is thermally pre-stressed.

11. The transparent reactive armor according to claim 1, 4, or 7, wherein the glass-ceramic material is selected from the group consisting of
 a. glass-ceramic with the main crystal phase high quartz mixed crystal;
 b. glass-ceramic with the main crystal phase keatit mixed crystal;
 c. glass-ceramic with the main crystal phase lithium disilicate;
 d. glass-ceramic with the main crystal phase lithium metasilicate;
 e. glass-ceramic with the main crystal phase nepheline;
 f. glass-ceramic with the main crystal phase spinel mixed crystal; and
 g. glass-ceramic with the main crystal phase forsterite.

12. The transparent reactive armor according to claim 4 or 7, wherein the ceramic material is selected from the group consisting of
 a. sapphire;
 b. spinel;
 c. aluminum garnet;
 d. aluminum oxide ceramic;
 e. spinel ceramic;
 f. aluminum oxynitride ceramic;
 g. yttrium oxide ceramic; and
 h. aluminum garnet ceramic.

13. The transparent reactive armor according to claim 1, wherein the matrix comprises a plastic material.

14. The transparent reactive armor according to claim 1, wherein the at least one front plate, the at least one explosives layer, and the explosives substrate layer are transparent to visible light.

15. The transparent reactive armor according to claim 1, wherein the armor is transparent as a whole such that the brightness value Y for standard illuminant A radiating the armor under 2°-observation is $Y_{A/2}°>50$.

16. The transparent reactive armor according to claim 1, wherein the absolute value of the difference in refractive indexes, $|\Delta n|$, between adjacent portions of the transparent reactive armor is, $|\Delta n|<0.25$.

17. The transparent reactive armor according to claim 1, wherein the explosive component is selected from the group consisting of
 a. perhydro-1,3,5-trinitro-1,3,5-triazine (RDX);
 b. octahydro-1,3,5,7-tetranitro-1,3,5,7-tetrazocine (HMX);
 c. pentaerythritol tetranitrate (PETN); and
 d. 2,2',4,4',6,6'-hexanitro phenylethylene (HNS).

18. The transparent reactive armor according to claim 1, wherein the explosive dispersion comprises particles of the explosive component having particle sizes of $\leq 1$ mm$^3$.

19. The transparent reactive armor according to claim 2, 7, or 13, wherein the plastic materials are selected from the group consisting of
 a. thermoplastic polyurethanes;
 b. polyvinyl butyrals;
 c. ethylene/vinyl acetate copolymers;
 d. polycarbonates;
 e. polymethylene methacrylates;
 f. polyurethanes;
 g. polycaprolactames;
 h. polyisoprenes;
 i. polyethylenes;
 j. polyethylene terephthalates;
 k. polyether imides;
 l. polyether etherketones;
 m. cross-linked or partly cross-linked polyester resins;
 n. cross-linked or partly cross-linked vinylester resins; and
 o. cross-linked or partly cross-linked epoxide resins.

20. The transparent reactive armor according to claim 1, wherein the at least one explosives layer is segmented.

21. The transparent reactive armor according to claim 1, wherein at least one of the at least one front plate, at least one explosive component layer, and the explosives substrate layer is strengthened with fibers.

22. The transparent reactive armor according to claim 21, wherein the fibers have diameters of smaller than 10 μm.

23. The transparent reactive armor according to claim 21, wherein the fibers have lengths of more than 5 mm.

24. The transparent reactive armor according to claim 21, 22, or 23, wherein the fibers are glass fibers, glass ceramic fibers, or plastic fibers.

25. The transparent reactive armor according to claim 1, wherein the absolute value of the difference in refractive indexes, $|\Delta n|$, between adjacent portions of the transparent reactive armor, is $|\Delta n|<0.1$.

26. The transparent reactive armor according to claim 1, wherein the absolute value of the difference in refractive indexes, $|\Delta n|$, between adjacent portions of the transparent reactive armor, is $|\Delta n|<0.01$.

* * * * *